(12) United States Patent
Schippan et al.

(10) Patent No.: US 9,168,886 B2
(45) Date of Patent: Oct. 27, 2015

(54) MOTOR VEHICLE HAVING A ROLLOVER PROTECTION SYSTEM

(71) Applicant: Bayerische Motoren Werke Aktiengesellschaft, Munich (DE)

(72) Inventors: Juergen Schippan, Assling (DE); Peter Holler, Landsberg (DE); Joerg Treptow, Jetzendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/535,411

(22) Filed: Nov. 7, 2014

(65) Prior Publication Data

US 2015/0061269 A1     Mar. 5, 2015

Related U.S. Application Data

(63) Continuation of application No. PCT/EP2013/059144, filed on May 2, 2013.

(30) Foreign Application Priority Data

May 10, 2012   (DE) .......................... 10 2012 207 820

(51) Int. Cl.
*B60R 21/13*        (2006.01)
(52) U.S. Cl.
CPC ........... *B60R 21/13* (2013.01); *B60R 2021/132* (2013.01)
(58) Field of Classification Search
CPC .......................... B60R 21/13; B60R 2021/132

USPC ......................................................... 280/756
See application file for complete search history.

(56) References Cited

U.S. PATENT DOCUMENTS

| | | | |
|---|---|---|---|
| 5,881,458 A | 3/1999 | Wolf et al. | |
| 5,890,738 A * | 4/1999 | Heiner et al. | 280/756 |
| 6,378,930 B1 * | 4/2002 | Brettmann | 296/85 |
| 7,032,927 B1 * | 4/2006 | Joranlien | 280/756 |
| 7,325,832 B2 | 2/2008 | Miki et al. | |
| 2004/0130136 A1 | 7/2004 | Muller | |
| 2009/0085337 A1 | 4/2009 | Vlahovic et al. | |
| 2009/0085376 A1 | 4/2009 | Schmitt | |

FOREIGN PATENT DOCUMENTS

| | | |
|---|---|---|
| DE | 75 04 021 U | 8/1975 |
| DE | 196 42 821 A1 | 6/1997 |
| DE | 201 03 001 U1 | 7/2001 |
| DE | 10 2006 015 756 A1 | 10/2007 |

(Continued)

OTHER PUBLICATIONS

German Search Report dated Jan. 28, 2013, with English translation (ten (10) pages).

(Continued)

*Primary Examiner* — Faye M Fleming
(74) *Attorney, Agent, or Firm* — Crowell & Moring LLP (57) ABSTRACT

A motor vehicle with a rollover protection system has at least one rollover support body. For the connection of the rollover support body to the body structure of the motor vehicle, a wide-based receiving device is provided in the area of a rear wheel house and/or of a side panel area. The fastening takes place by screws which are oriented in the transverse direction of the motor vehicle.

15 Claims, 6 Drawing Sheets

(56) References Cited

FOREIGN PATENT DOCUMENTS

| | | |
|---|---|---|
| DE | 10 2007 046 535 A1 | 4/2009 |
| DE | 10 2007 046 536 A1 | 4/2009 |
| EP | 1 028 050 A2 | 8/2000 |
| EP | 1 547 874 A1 | 6/2005 |
| EP | 1 902 909 A1 | 3/2008 |
| FR | 2 924 998 A1 | 6/2009 |
| GB | 2 425 093 A | 10/2006 |
| GB | 2 456 035 A | 7/2009 |

OTHER PUBLICATIONS

International Search Report (PCT/ISA/210) dated Jun. 21, 2013, with English translation (six (6) pages).

* cited by examiner

MOTOR VEHICLE HAVING A ROLLOVER PROTECTION SYSTEM

CROSS REFERENCE TO RELATED APPLICATIONS

This application is a continuation of PCT International Application No. PCT/EP2013/059144, filed May 2, 2013, which claims priority under 35 U.S.C. §119 from German Patent Application No. 10 2012 207 820.7, filed May 10, 2012, the entire disclosures of which are herein expressly incorporated by reference.

BACKGROUND AND SUMMARY OF THE INVENTION

The invention relates to a motor vehicle having a rollover protection system with at least one rollover support body, which is accommodated in a mounting, the mounting being fastened via screws with the interposition of a vehicle-fixed receiving device to a body structure of the motor vehicle.

A motor vehicle of this type is known from German Patent Document DE 10 2006 015 756 A1 and has a bow-shaped rollover support body which is connected to the vehicle body in lateral receiving devices. In a first variant of the known motor vehicle, which is illustrated, for example, in FIG. 4 of German Patent Document DE 10 2006 015 756 A1, mountings for the rollover supporting body (guide rails 6) are screwed into a receiving device (mounting 7a) fixed to the vehicle. These receiving devices are welded to the body of the motor vehicle. The threaded fasteners (screws, bolts) penetrate the receiving devices and the mountings in the X-direction of the motor vehicle.

In the case of the known vehicle, it is a disadvantage that the receiving devices are designed such that they accommodate the mountings in the X-direction in an essentially form-fitting manner. Accordingly, the receiving devices have a comparatively small dimension in the X-direction of the motor vehicle, so that the receiving devices can support themselves by means of only a very narrow base on the body of the motor vehicle. The receiving devices therefore have to be constructed with a relatively large material thickness. In the same manner, the vehicle body sections, to which the receiving devices are fastened by welding, should have a relatively stiff construction. In addition, as a result of the screwing-together in the X-direction, a lever arm inevitably occurs for forces introduced into the rollover-supporting body. This lever arm is a result of the distance of the screw heads from the vehicle body section on which the receiving device is fastened.

It is an object of the invention to provide an improved connection between the rollover protection system and the body structure of the motor vehicle.

This and other objects are achieved by a motor vehicle having a rollover protection system with at least one rollover support body, which is accommodated in a mounting, the mounting being fastened via threaded fasteners with the interposition of a vehicle-fixed receiving device to a body structure of the motor vehicle. The receiving device has a dimension in the X-direction of the motor vehicle which is larger than the dimension of the mounting in the X-direction, with a fastening by the threaded fasteners, whose longitudinal axis extends approximately in the Y-direction of the motor vehicle. The receiving device is arranged on the vehicle body structure in the area of a wheel house and/or of a side panel area of the motor vehicle. The receiving device has at least one spar-type section extending approximately in the Z-direction of the motor vehicle.

On the one hand, it is an aspect of the invention to provide the receiving device with a clearly wider construction than the mounting. This creates a wider supporting base for the receiving device, so that the forces occurring at the rollover support body during a rollover can advantageously be introduced into the receiving device and thereby into the vehicle body. It thereby becomes possible to dimension the sheet metal thickness at the vehicle body section, on which the receiving device is placed, comparatively small. It is also an aspect of the invention to fasten the mounting at the receiving device by threaded fasteners (hereafter referred to generically as "screws"), which are arranged "laterally" (i.e. offset in the X-direction) of the rollover-supporting body. In this case, the longitudinal axes of the screws for fastening the mounting to the receiving device extend at least approximately in the Y-direction of the motor vehicle. By means of this connection, a lever arm is achieved that is as small as possible, between the contact area of the screw head on the receiving device and the body of the motor vehicle, which is advantageous for the introduction of forces which, in the event of a rollover of the motor vehicle, act in the X-direction of the motor vehicle upon the rollover-supporting body.

Further, according to the invention, the receiving device has a section which extends in the Z-direction of the motor vehicle and by which a stiffening of the receiving device takes place, in that a spar-type section is formed with an interior cavity in order to create a particularly stiff area for a stable connection of the mounting. The receiving device is placed on a vehicle body structure at the interior side of a rear wheel house and/or of a side panel area of the motor vehicle. The connection takes place, for example, by spot welding.

In a preferred further development of the invention, the spar-type section is formed by the receiving device, on one side, and by a further component designed as a closure profile, on the other side. In this case, the receiving device is preferably provided with a profiling in the form of a bulging by which a closed hollow profile with a high bending stiffness is formed, which forms a particularly stiff structure for the linking of the mounting. As an alternative or in addition, the further component constructed as a closure profile may have a profiling in the form of a bulging for forming the spar-type section.

In a preferred embodiment of the invention, at least one supporting body is provided on the back side of the receiving device, which supporting body connects the top side of the wheel house with the back side of the receiving device. By means of the supporting body and the receiving device, a stable structure is created above the wheel house for linking the mounting, which results in a small lever arm for the forces acting upon the rollover protection system in the event of a vehicle rollover.

As a further development of the invention, internal threads are provided at the receiving device for engaging the screws. The screws for the fastening of the mounting can thereby easily be inserted into the receiving device. In particular, no accessibility is required at the back side of the receiving device. Because of the limited thickness of the material of the receiving device, the internal threads for the screws are preferably not constructed in the receiving device itself but as separate nuts, for example, as weld nuts.

In a further development of the invention, at least one reinforcement and/or one angle bracket or the like is provided. As a result, the receiving device can be reinforced on the interior side of the vehicle and/or on the exterior side of the vehicle and/or can be supported with respect to the surrounding vehicle body structure. In this manner, an additional reinforcement of the connection of the rollover protection system to the body of the motor vehicle is obtained.

The invention has an advantageous effect in the body shell of a motor vehicle when a console for a component of the rear axle of the motor vehicle is arranged on the exterior side of the wheel house, in the area opposite the receiving device for the mounting of the rollover supporting body. In this case, in a first step, the axle console is connected with the exterior side of the wheel house, for example, by spot welding. By means of the wide-based further development of the receiving device, the latter can subsequently, in a second step, be spot-welded to the interior side of the wheel house, without the axle console being in the way of the spot welding guns.

In a preferred further development of the invention, the mounting has a closed cross-section and accommodates the rollover supporting body within this cross-section. On both sides of the mounting, thus, viewed in the driving direction of the motor vehicle, in front and behind the rollover supporting body, in each case, at least one fastening section is provided for the penetration by at least one screw. The fastening sections project from the closed cross-section and, in the installation position of the mounting in the motor vehicle, extend approximately in an XZ-plane of the motor vehicle. The fastening sections extend approximately parallel to the surface of the receiving device to which the mounting is fastened.

In an advantageous further development of the invention, the mounting is fastened by way of its fastening sections at both sides of the mounting by way of two screws respectively to the receiving device. The screws are to be arranged at both sides of the mounting in each case as far as possible toward the outside and/or at a mutual distance that is as large as possible, so that a supporting base is obtained that is as large as possible. In a preferred further development of the invention, the mounting is fastened on both sides by use of two screws respectively to the receiving device. As a result of this fastening by use of four screws, a weight-optimized connection is obtained which has a wide supporting base.

The mounting is, for example, constructed as an extruded profile. As an alternative, the mounting may also consist, for example, of two put-together half-shells. Particularly when it is implemented as an extruded profile, the mounting preferably consists of a light-metal material. However, naturally the mounting may also be produced of a different suitable material.

The receiving device is preferably produced as a deep-drawn part of a steel material, so that a welded connection can be established in a simple manner with a vehicle body structure produced of a steel material. However, the receiving device may naturally also be produced of a different suitable material, for example, of a light-metal material, such as an aluminum alloy. The implementation in a light-metal material will mainly be advantageous when the vehicle body structure is also produced of a light metal material, in order to also be able to establish a welded connection in a simple manner. As an alternative, the receiving device may, for example, consist of a fiber-reinforced plastic material, for example, of CFP (carbon-fiber-reinforced plastic).

The rollover support body may be accommodated in the mounting so that it can be displaced in the Z-direction and so that the rollover support body, in the event of a vehicle rollover, can be moved out from a lowered not-in-use position into an upwardly displaced supporting position. Naturally, the rollover protection system may also be constructed as a passive system with stationary rollover support bodies.

The mounting preferably has an approximately rectangular cross-section, so that the wall of the mounting that is on the exterior side of the vehicle rests planely against the receiving device. In the case of a mounting having a rectangular cross-section, the rollover support body preferably is also rectangular, so that, in addition to an advantageous utilization of space, an antitwist protection of the rollover support body in the mounting is also obtained. However, naturally the mounting may also have another suitable cross-section, and may, for example, be circular, oval, elliptical, etc. As an alternative, the mounting may also have a cross-section that deviates from these basic geometrical shapes.

As a further development of the invention, one mounting respectively for a respective "independent" rollover support body is provided on both lateral areas of the motor vehicle. This facilitates the mounting of the rollover protection system in the case of position deviations between the right and the left rollover support body. As an alternative, the rollover protection system may naturally also have a single rollover support body extending over the width of the vehicle, whose legs are accommodated in the two mountings on the exterior sides of the vehicle.

For increasing the stiffness of the rollover protection system and thereby of the entire rear area of the motor vehicle according to the invention, a strut may be provided which extends in the transverse direction of the motor vehicle and which mutually connects the two mountings fixed to the vehicle body. A compensation of tolerances in the transverse direction of the motor vehicle can take place in a simple manner, for example, by means of a screwed connection having oblong holes.

The motor vehicle according to the invention is a motor vehicle with a roof that can be opened, for example, a convertible or a roadster. Naturally, the motor vehicle may also be a vehicle that is open at the top and does not have a roof. The motor vehicle may be constructed as a two-seater or, in addition to the front seats, may also have back seats.

The present invention is analogously also implemented if—deviating from the wording of the claims—the at least one rollover support body is connected with the receiving device without an interposition of a separate mounting. This is particularly relevant in the case of a rollover protection system having a rollover support body that cannot be displaced. In this case, the rollover support body is equipped directly with at least one fastening section which is screwed to the receiving device.

The X, Y, Z coordinates used in connection with the present invention are defined as follows: the X-direction corresponds to the driving direction when the motor vehicle is driving straight ahead; the Y-direction is defined as the transverse direction of the motor vehicle and therefore extends perpendicular to the driving direction in a horizontal plane; and the Z-direction corresponds to the vertical axis of the motor vehicle and therefore extends perpendicular to the driving direction in a vertical plane.

All position indications used in connection with the present invention relate to the installation position of the rollover protection system and its components in the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
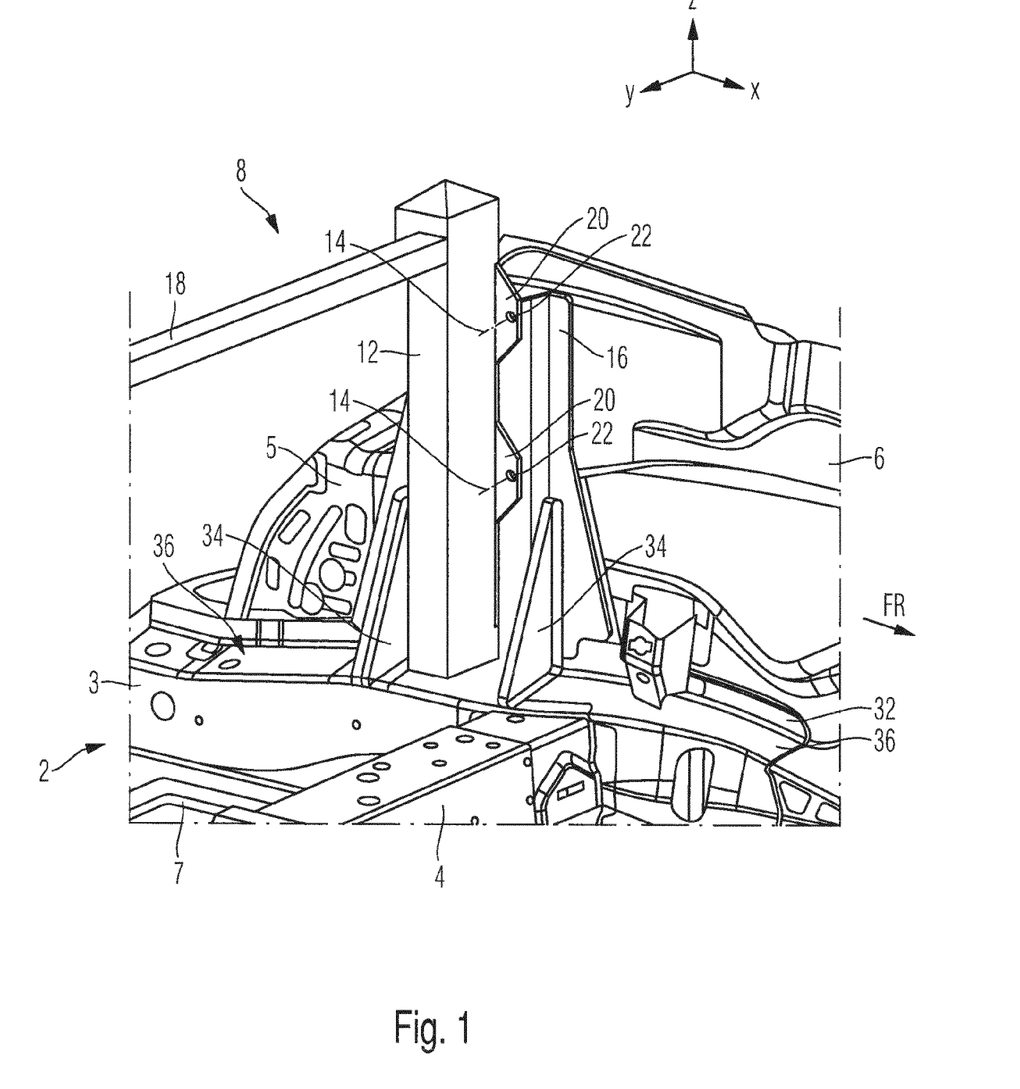
FIG. 1 is a perspective view of the rear area of the body shell of a motor vehicle having a rollover protection system, with the viewing direction from the vehicle center diagonally toward the rear toward the left vehicle side.
Figure 2:
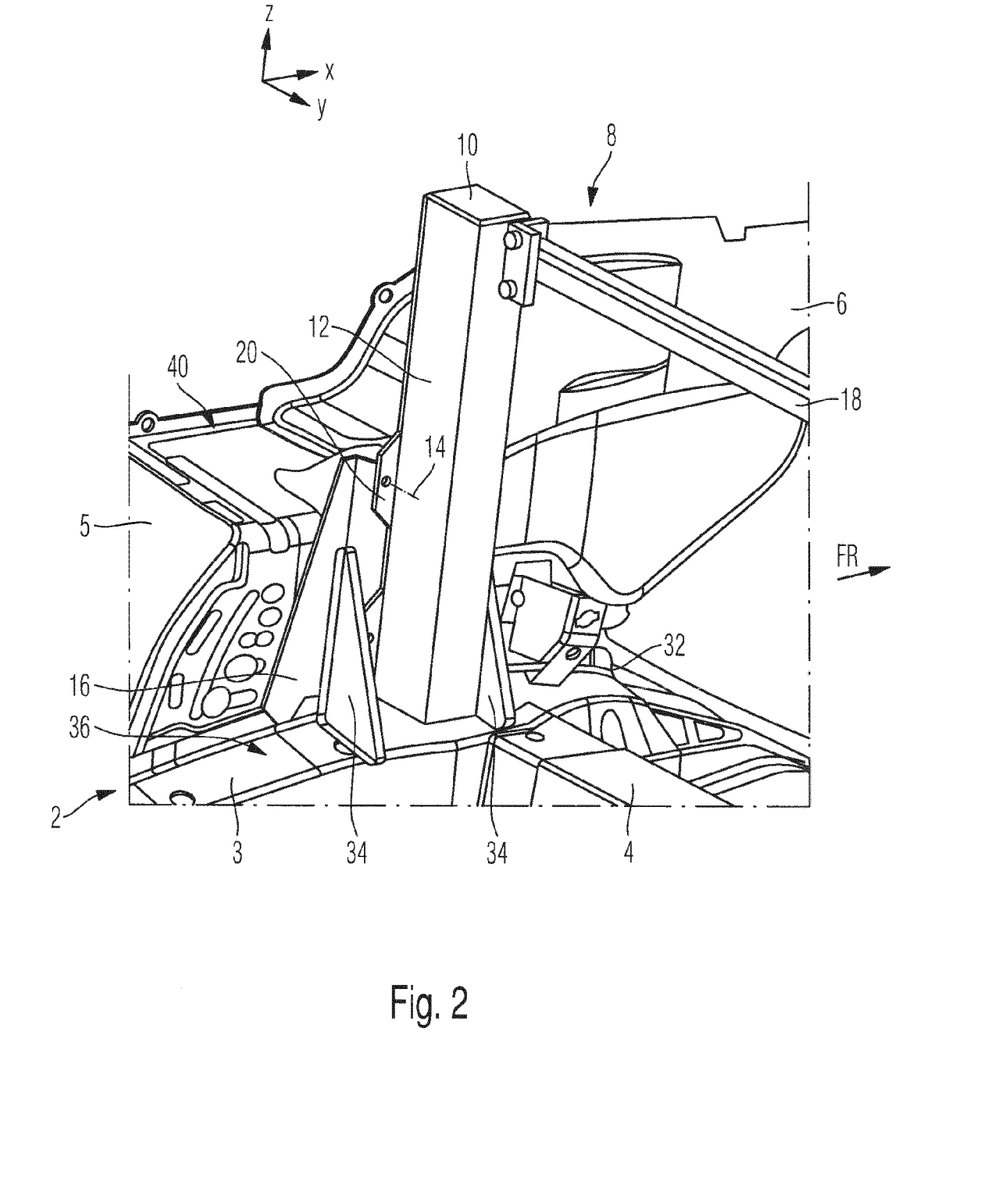
FIG. 2 is a representation corresponding to FIG. 1, with the viewing direction diagonally to the front toward the left vehicle side.
Figure 3:
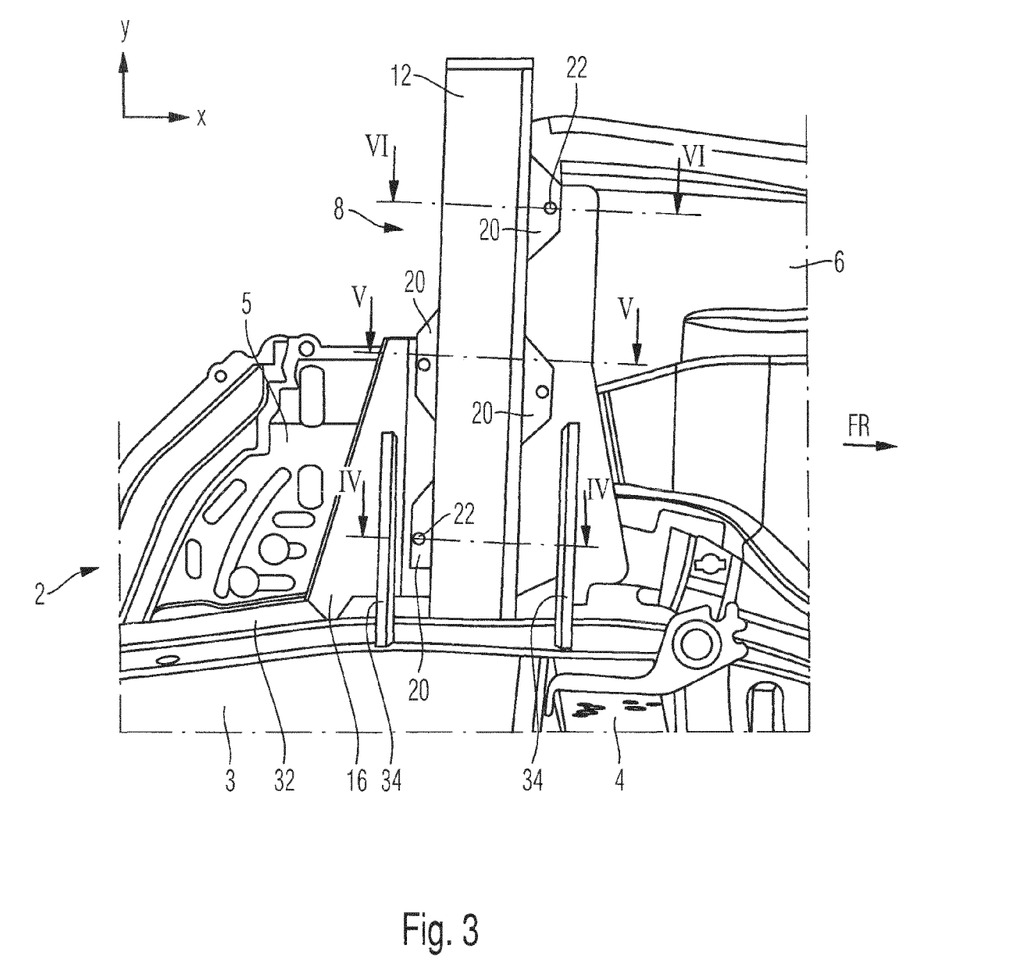
FIG. 3 is a representation corresponding to FIG. 1, with the viewing direction in the Y-direction of the motor vehicle toward the left vehicle side.

FIGS. 1 to 3 only show a detail of the rear area of the left vehicle side of a motor vehicle which, as a whole, has the reference number 2 and has a roof that can be opened. The right half of the motor vehicle 2 has a mirror-inverted construction. The driving direction is marked FR. The directions in space X, Y and Z are obtained from the coordinate system of FIGS. 1 to 6.

A rear side member 3 of the motor vehicle 2 is adjoined on the exterior side of the vehicle in the area of a seat cross-member 4 by a vehicle body structure with a rear wheel house 5 and a side panel area 6. On the rear side, a trunk bottom 7 adjoins the seat cross-member 4. In the area of the wheel house 5 and of the side panel area 6, a rollover protection system is provided which, as a whole, has the reference number 8.

The rollover protection system 8 essentially has a right and a left rollover protection body 10, only the left rollover protection body 10 being visible in the drawing. The rollover support bodies 10 are displaceable in the Z-direction of the motor vehicle 2 accommodated in mountings (not illustrated FIGS. 1 and 3). The mountings 12 are fastened to receiving devices 16 of the motor vehicle 2 by screws 14 illustrated in a stylized manner. The two mountings 12 are mutually connected (not illustrated in FIG. 3) by a cross-strut 18, which extends in the Y-direction of the motor vehicle 2.

The mountings 12 are designed as a hollow profile with a closed cross-section and are formed, for example, by extruded profiles. Fastening sections 20, which extend approximately in an XZ-plane of the motor vehicle 2, project on the exterior side from the approximately rectangular cross-section of the mountings 12. The fastening sections 20 have through holes 22 for the feeding-through of the screws 14.

Figure 4:
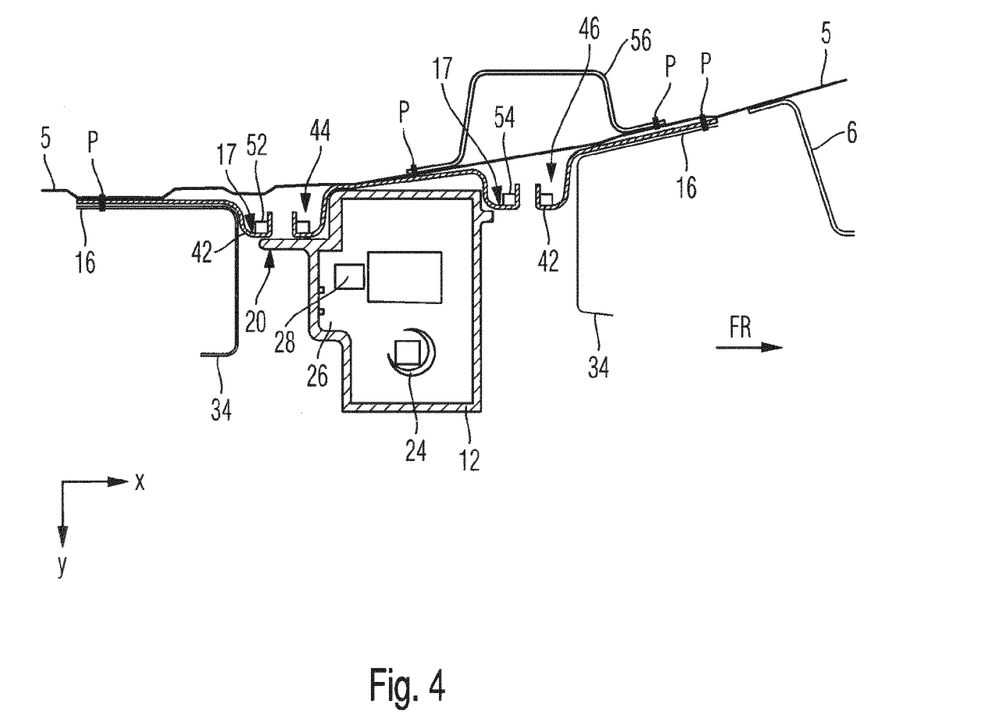
FIG. 4 is a sectional view corresponding to the sectional course line IV-IV in FIG. 3.
Figure 5:
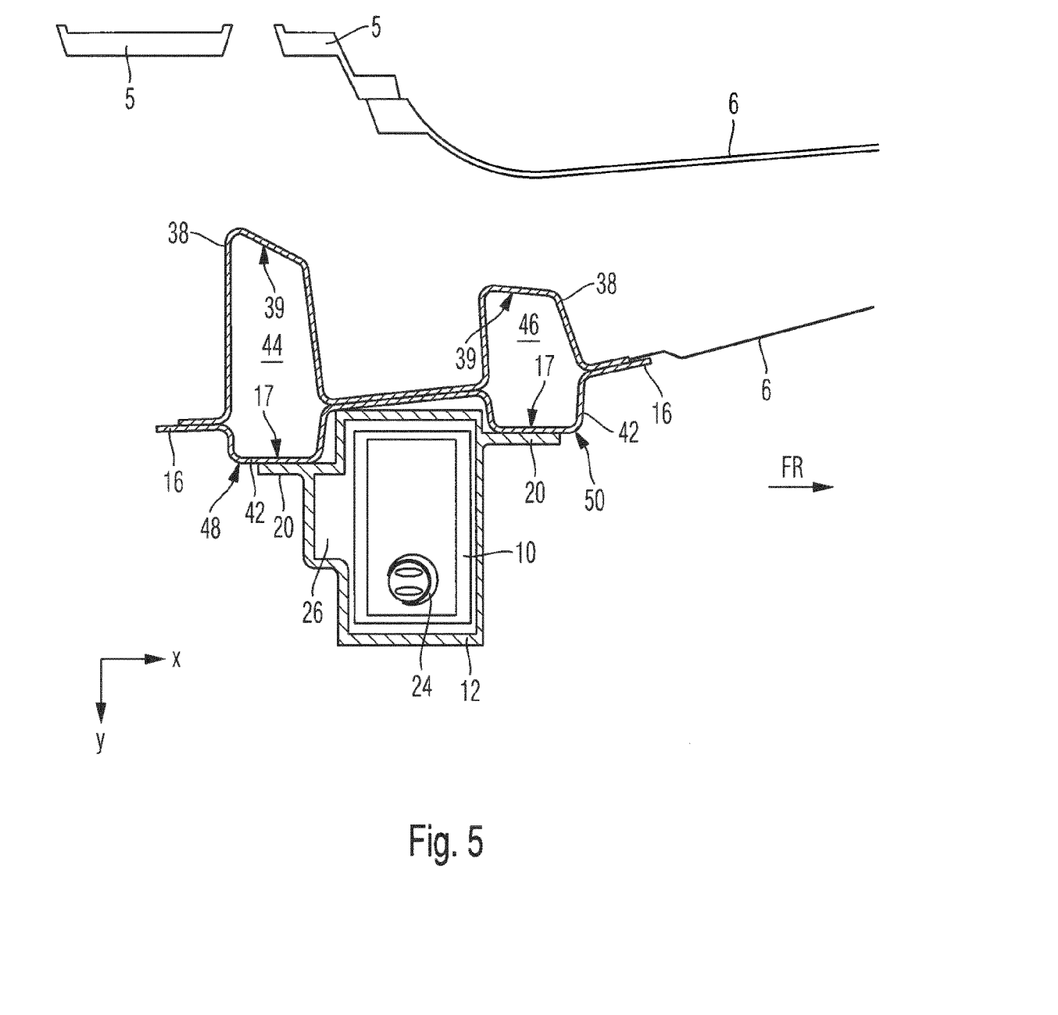
FIG. 5 is a sectional view corresponding to the sectional course line V-V in FIG. 3.
Figure 6:
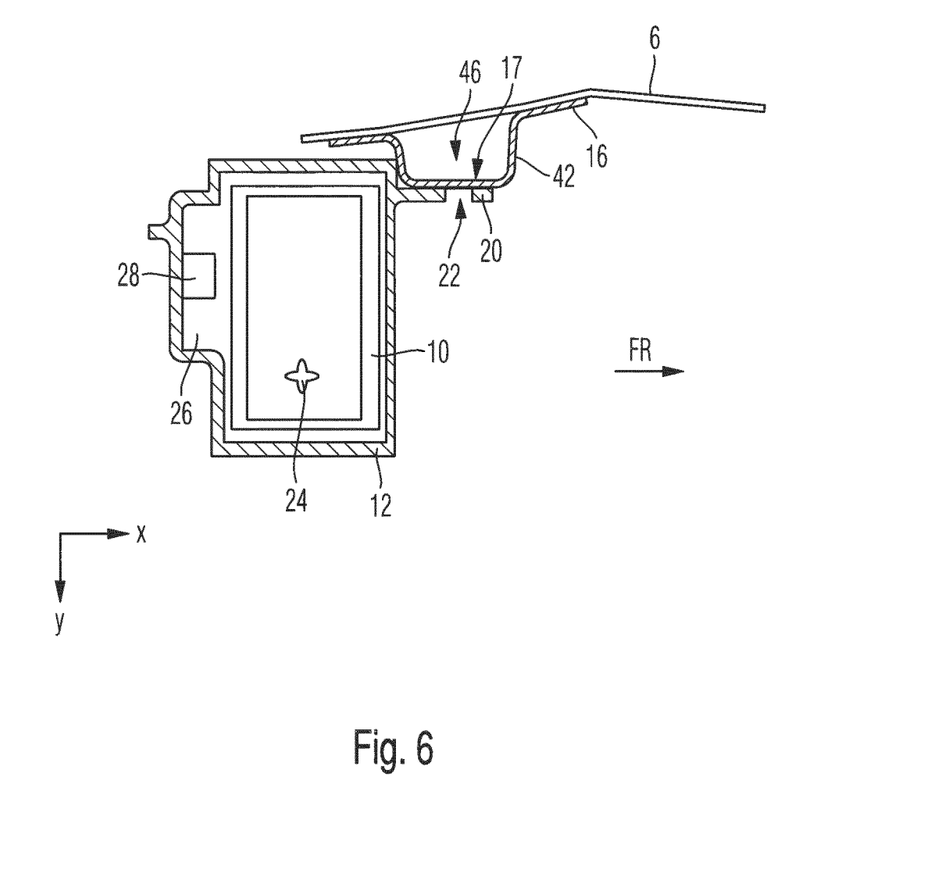
FIG. 6 is a sectional view corresponding to the sectional course line VI-VI in FIG. 3.

The rollover support bodies 10 also have an approximately rectangular design in the cross-section and are guided in the interior of the mountings 12. As illustrated in FIGS. 4 to 6, spring arrangements 24 for the moving-out of the rollover support bodies 10 are provided in the interior of the rollover support bodies 10. In addition, detent devices 28 for the locking of the rollover support bodies 10 displaced upward into their supporting position in the event of danger are arranged in lateral pockets 26 of the mountings 12.

Above the rear side member 3, the receiving devices 16 are welded to the interior side of the wheel house 5. The receiving devices 16 extend over almost the entire height of the mountings. They begin above the welding flanges 32 of the rear side members 3 and end approximately at the level of the frontal upper fastening sections 20 of the mountings 12. The receiving devices 16 clearly have a wider construction than the mountings 12 and therefore provide a wide-based support on the interior side of the wheel houses 16.

For stiffening the vehicle body structures, which are formed of the wheel house 5 and the side panel area 6, in the area of the receiving devices 16, front and rear angle brackets 34 are provided, whose short legs are welded to the top sides 36 of the side members 3 and whose long legs are welded to the front sides of the receiving devices 16.

On the back sides of the receiving devices 16, supporting bodies 38 are provided which connect the top sides 40 of the wheel houses 5 with the back sides of the receiving devices 16 and in this manner generate a stiffening of the composite of the wheel house 5 and the receiving device 16.

If required for reasons of stiffness, the receiving devices 16 may additionally be screwed to an angle bracket 34 or to both angle brackets 34, by use of screws (not shown) extending in the X-direction.

As illustrated in FIGS. 4 to 6, the receiving devices 16 are profiled such that spar-type sections 42 are obtained in the Z-direction of the receiving devices 16, which spar-type sections 42, at least in sections, in connection with the wheel house 5, the supporting bodies 38 or the side panel area 6, form hollow profiles 44 and 46. For this purpose, the receiving devices 16 have a profiling in the form of bulgings 17. As a result of the closed hollow profiles 44 and 46 formed in such a manner from the two "half-shells" 16 and 5 or 16 and 38 or 16 and 6, particularly stiff areas are created which permit a stable connection of the mountings. The supporting bodies 38 also have bulgings 39 by which the spar-type sections 42 are formed with a cross-section that is appropriately large for the bending stiffness, mainly in the transverse direction Y of the vehicle.

Among other things, it is essential that the supporting bodies 38 extend above the top side 40 of the wheel house 5 and, as a result, together with the receiving devices 16, form a connection for mountings 12 of the rollover protection system 8, which extend at least partially above the wheel house 5. This connection, which extends in the upward direction beyond the actual wheel house 5, because of its spar-type sections 42, has a high stiffness and therefore represents a stable structure for the screwed connection with the mounting 12. Because of the connection projecting beyond the wheel house 5, in addition, a small lever arm is obtained for the forces acting upon the rollover protection system 8 in the event of a vehicle rollover.

As illustrated in FIG. 6, the stiff connection for the receiving device 12 is also extended above the supporting body 38 in that the receiving device 16 together with the side panel area 6 continues the frontal hollow profile in the upward direction.

The front sides of the spar-type sections 42 are designed as contact surfaces 48 and 50 for the fastening sections 20. On the back sides of the contact surfaces 48 and 50, weld nuts 52 (not shown) are provided, for receiving the screws 14. A further weld nut 54 is illustrated in FIG. 4, which is used for the fastening of, for example, a belt retractor.

As illustrated in FIG. 4, consoles 56 are mounted by spot welding P on the exterior sides of the wheel houses 5. The consoles 56 accommodate components of a rear axle of the motor vehicle 2, which is not illustrated. Sufficiently large distances between the edges of the consoles 56 and the edges of the receiving devices 16 permit an unhindered spot welding P also between the wheel houses 5 and the receiving devices 16.

The invention can be summarized as follows. A motor vehicle 2 having a rollover protection system 8 has at least one rollover support body 10. For the connection of the rollover support body 10 to the body structure of the motor vehicle 2, a wide-based receiving device 16 is provided in the area of a rear wheel house 5 and/or a side panel area 6. The fastening takes place by screws 14, which are oriented in the transverse direction of the motor vehicle 2. This results in an advantageous introduction of force in the event of a rollover of the motor vehicle 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a rollover protection system with at least one rollover support body accommodated in a mounting, comprising:
    a vehicle-fixed receiving device, wherein the mounting is fastened via threaded fasteners to a body structure of the motor vehicle with an interposition of the receiving device, wherein
    the receiving device has a dimension in an X-direction of the motor vehicle larger than a dimension of the mounting in the X-direction,
    the threaded fasteners that fasten the mounting to the body structure via the receiving device are oriented with a longitudinal axis extending in approximately a Y-direction of the motor vehicle,
    the receiving device is arranged on the body structure in an area of a wheel house and/or a side panel region of the motor vehicle, and
    the receiving device has at least one spar-type section that extends approximately in a Z-direction of the motor vehicle.

2. The motor vehicle according to claim 1, wherein the spar-type section is composed of a bulge of the receiving device and/or a bulge of a further component developed as a closure profile.

3. The motor vehicle according to claim 2, further comprising: at least one supporting body arranged on a back side of the receiving device, the supporting body connecting a top side of the wheel house with the back side of the receiving device.

4. The motor vehicle according to claim 3, wherein the supporting body is the further component.

5. The motor vehicle according to claim 1, wherein the receiving device has an internal thread for engagement with a respective threaded fastener.

6. The motor vehicle according to claim 1, further comprising: at least one reinforcement bracket configured to reinforce the receiving device on an interior side of the vehicle.

7. The motor vehicle according to claim 1, further comprising: at least one reinforcement bracket configured to reinforce the receiving device on an exterior side of the motor vehicle.

8. The motor vehicle according to claim 2, further comprising: a console for a component of a rear axle of the motor vehicle, the console being arranged on an exterior side of the wheel house opposite the receiving device.

9. The motor vehicle according to claim 1, wherein: the mounting has a closed cross-section and has fastening sections projecting from the cross-section, the fastening sections extending in an installation position of the mounting in the motor vehicle approximately in an XZ-plane of the motor vehicle, and at least one fastening section is provided on a side of the cross-section facing the driving direction and at least one fastening section is arranged on a side of the cross-section facing away from the driving direction.

10. The motor vehicle according to claim 9, wherein on the side facing the driving direction and on the side facing away from the driving direction the mounting is fastened to the receiving device via two threaded fasteners, respectively.

11. The motor vehicle according to claim 1, wherein the rollover support body is displaceable in the mounting in the Z-direction of the motor vehicle.

12. The motor vehicle according to claim 1, wherein the mounting has an approximately rectangular cross-section.

13. The motor vehicle according to claim 9, wherein the mounting has an approximately rectangular cross-section.

14. The motor vehicle according to claim 1, wherein the rollover protection system comprises a right and a left rollover support body, the respective right and left rollover support bodies being accommodated in respective right and left mountings.

15. The motor vehicle according to claim 1, wherein a longitudinal axis of the mounting extends along a height direction of the motor vehicle.

* * * * *